United States Patent [19]

Berglund

[11] 4,436,629

[45] Mar. 13, 1984

[54] METHOD FOR RECOVERING USEFUL PRODUCTS FROM WASTE PRODUCTS OBTAINED WHEN MANUFACTURING ALUMINIUM FLUORIDE

[75] Inventor: Lennart H. A. Berglund, Helsingborg, Sweden

[73] Assignee: Boliden Aktiebolag, Stockholm, Sweden

[21] Appl. No.: 333,024

[22] Filed: Dec. 21, 1981

[30] Foreign Application Priority Data

Jan. 16, 1981 [SE] Sweden ................................ 8100218

[51] Int. Cl.$^3$ ............................................... C02F 1/60
[52] U.S. Cl. .................................... 210/712; 210/724; 210/91
[58] Field of Search ............... 210/710, 712, 714, 716, 210/723, 724, 726, 737, 738, 915

[56] References Cited

U.S. PATENT DOCUMENTS 3,551,332 12/1970 Baumann et al. ................ 210/915 X
4,028,237 6/1977 Nishimura et al. ............... 210/915 X
4,320,012 3/1982 Palm et al. ........................ 210/724 X

FOREIGN PATENT DOCUMENTS 51-96159 8/1976 Japan ................................... 210/915

Primary Examiner—Thomas G. Wyse

Attorney, Agent, or Firm—Brumbaugh, Graves, Donohue & Raymond

[57] ABSTRACT

The invention relates to a method for recovering useable products from waste products deriving from the manufacture of aluminium fluoride on the basis of aluminium hydroxide and fluosilicic acid. Silica contaminated with fluorine and aluminium and obtained in the manufacture of aluminium fluoride is dissolved with a strongly basic hydroxide, whereafter the first solution obtained is mixed with a second solution, obtained by dissolving aluminium hydroxide with a strongly basic hydroxide, and with waste mother liquor and optionally also washing water from the manufacture of aluminium fluoride, in such proportions that the pH-value of the mixture is from about 10-14. The silicate content of the waste products supplied is precipitated as a silicoaluminate, which is separated off, preferably by filtration, for optional further treatment or for direct use, whereafter fluorine, when present in the waste products, is recovered from filtrate by further precipitation, and whereafter the filtrate is passed to a recipient or utilized, for example, as process water in other processes. The fluorine content can be recovered from the filtrate by adding thereto an aluminium compound in an amount sufficient to precipitate out substantially all the fluorine contained in the filtrate as a fluoroaluminate respectively, which is then separated off.

9 Claims, 1 Drawing Figure

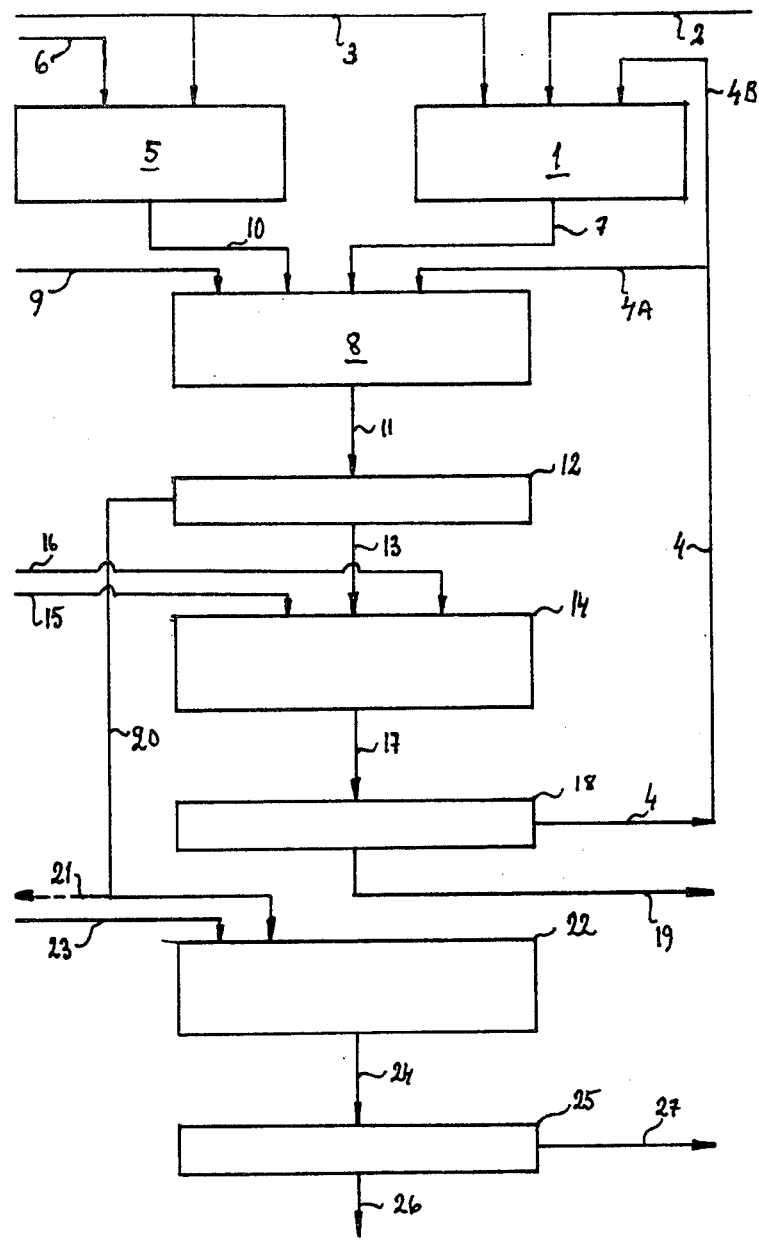

METHOD FOR RECOVERING USEFUL PRODUCTS FROM WASTE PRODUCTS OBTAINED WHEN MANUFACTURING ALUMINIUM FLUORIDE

DESCRIPTION

1. Technical Field

The present invention relates to a method for recovering useful products from waste products obtained when producing aluminium fluoride from aluminium hydroxide and fluosilicic acid; and more particularly to recovering sodium silicoaluminates and sodium fluoroaluminates from silica waste, mother liquor and wash-water deriving from the manufacture of aluminium fluoride.

An object of the present invention is to obtain a possibility of recovering useful and economically valuable products from the waste products obtained in the aluminium fluoride production.

2. Background of the Invention

When manufacturing aluminium fluoride, several troublesome waste products are obtained which must be deposited and, optionally, rendered harmless. Thus, there is obtained a silica waste which contains fluorine and aluminium impurities, and a mother liquor and a wash-water containing fluorine, aluminium and silicon. These waste products present a serious problem, since they occur in relatively large quantities and require complicated and expensive treatment before they can be deposited. It is true that silica residues per se can be deposited, but—as will be understood—the direct deposit of silica contaminated with large quantities of harmful impurities cannot be tolerated. The mother liquor and the wash water must be neutralized with calcium hydroxide to a pH-value of 10, at which the fluorine and silicate content thereof precipitates. This precipitate is then separated off from the mother liquor and wash water, for example by centrifugation, and subsequently deposited.

Thus, the aforementioned waste products constitute a serious environmental problem, even though they may be treated in the manner indicated before being deposited. In addition, substantial amounts of silicon and fluorine are lost when the waste is treated in said manner.

The reactions involved in the production of aluminium fluoride is given below, the waste products being underlined.

1.

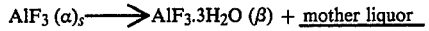

2.

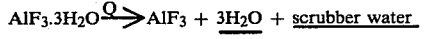

3.

Using fluosilicic acid as a starting material and ammonia active silica and cryolite can be prepared (AT, B, 315128). Thereby ammonium fluoride and silica are primarily prepared, whereafter the ammonium fluoride is reacted with sodium aluminate to the formation of cryolite.

SE,B, 366723 relates to a process to recover fluorine and aluminium from diluted, aqueous solutions, particularly mother liquors obtained in the crystallization of aluminium fluoride, whereby the mother liquors are treated with ammonia, ammonium dicarbonate to give a chiolite-analogous ammonium compound, [(NH$_4$)$_5$Al$_3$F$_{14}$]. The precipitation of said compound is carried out at pH 6-6.5.

SE,B, 7502835-7 relates to a concentrated synthetic fluxing agent based on calcium fluoride, where remaining fluorine quantities from the production of aluminium fluoride from fluosilicic acid and aluminiumhydroxide are precipitated using a calcium compound.

DISCLOSURE OF THE PRESENT INVENTION

The present invention relates to a surprisingly distinctive method for recovering valuable substances in the form of useful products from waste of the aforedescribed kind, while at the same time substantially eliminating the environmental problems created by the waste. The method according to the invention is also of economic interest, since, among other things, the waste need not be neutralized, meaning that no calcium hydroxide need to be used, which in turn means lower costs.

The present method is thus characterized by dissolving silica obtained in the manufacture of aluminium fluoride and contaminated with, inter alia, fluorine and aluminium, in a strongly basic hydroxide; mixing the first solution obtained with a second solution obtained by dissolving aluminium hydroxide with a strongly basic hydroxide, and with waste mother liquor and optionally also washing water from the manufacture of aluminium fluoride in such proportions that the pH-value of the mixture lies between about 10 and 14, the silica content of the waste products supplied being precipitated as a silicoaluminate, which is separated off, preferably by filtration, for optional further treatment or for direct use, whereafter fluorine, if present from the waste products, is recovered from the filtrate by adding thereto an aluminium compound in an amount sufficient to precipitate substantially all the fluorine content contained in the filtrate as a fluoroaluminate, which is separated off, preferably by filtration, for further use, and whereafter the final filtrate is passed to a recipient or utilized, for example, as process water in other processes.

Further characteristics of the invention are set forth in the accompanying claims.

Thus, the useful product produced in the first stage is a silicoaluminate, preferably a silicoaluminate of an alkali metal, such as sodium silicoaluminate. This means that in a second stage the fluorine content of the waste products can be recovered in the form of a fluoroaluminate, preferably sodium fluoroaluminate, which corresponds to cryolite. Such products as sodium silicoaluminate, and sodium fluoroaluminate (cryolite) can be used directly, and are requested by the market. Thus, sodium silicoaluminate can be used as a filler in the paper-making industry. Sodium fluoroaluminate or cryolite is used to a large extent as a fluxing agent when producing aluminium electrolytically.

According to the invention, the useable products are recovered from the waste in sequential steps in a coherent process, in which first silicon and aluminium are recovered in the form of a silicoaluminate, preferably sodium silicoaluminate, and the fluorine content in an optional subsequent step is recovered, in the form of a fluoroaluminate, preferably sodium fluoroaluminate, i.e. cryolite.

When recovering the silica content of waste products of the aforementioned kind, for example in the form of sodium silicoaluminate, there is prepared firstly a sodium silicate solution by dissolving silica waste deriving from the manufacture of aluminium fluoride in sodium hydroxide, and secondly a sodium aluminate solution, by dissolving aluminium hydroxide in sodium hydroxide. The resultant two solutions are added to a mixture of said mother liquor and the washing water derived from the manufacture of aluminium fluoride, in such an amount that substantially all of the silicate content precipitates as sodium silicoaluminate in the pH-range of 10–14. The sodium silicoaluminate will precipitate practically instantaneously in the form of a very fine precipitate, which can readily be separated off from the mixture by filtration, e.g. by vacuum and/or pressure filtration. Subsequent to separating off this solid phase, it is slurried, suitably in warm water—together with a minor quantity of sodium hydroxide, in order to decompose any sodium fluoroaluminate which may have precipitated together with the sodium silicoaluminate. The suspension obtained is filtered off and the solid residual silicate product is dried. The alkaline washing water is suitably returned to the next precipitation cycle, in which sodium silicoaluminate is precipitated. It will be understood that the same process steps can be carried out using other strongly basic hydroxides than sodium hydroxide as the solubilizing agent, and that silicoaluminate can be produced from other alkali metals, alkaline earth metals or ammonium.

The filtrate obtained after precipitating the silicate content of the mixture contains the fluorine content of the waste products in the form of fluoride ions. If the fluoride content of the filtrate is so low that the filtrate can be deposited in its present form from an environmental point of view, the filtrate is passed to a suitable recipient. In the majority of cases, however, the fluorine content, in fluoride form, will be so high as to make depositing impermissable. When the fluorine-containing filtrate also contains sodium ions from the previous stage, the fluoride content can be precipitated out as cryolite, by adding an aluminium compound to the filtrate. A suitable aluminium compound in this respect is aluminium sulphate, which is added in such an amount that all the sodium fluoride contained by the filtrate will precipitate out as sodium fluoroaluminate (cryolite). The precipitate is filtered off and dried. The filtrate, which now contains minor quantities of sodium sulphate, can be discharged to a suitable recipient or used as process water in other processes.

An exemplary, preferred embodiment of the process will now be described in more detail with reference to the accompanying drawing, the single FIGURE of which is a flow sheet of said embodiment.

A sodium silicate solution is prepared by supplying silica waste to a dissolver 1 through a conduit 2 and a 50%-sodium-hydroxide solution via a conduit 3 respectively, whereby alkaline washing water is charged simultaneously via the conduit 4b, to produce a pumpable silicate solution. The silica waste dissolves rapidly at a temperature range of 70°–100° C. At the same time there is prepared a sodium aluminate solution by charging to a dissolver 5 through a conduit 6 aluminium hydroxide containing crystal water, and a 50%-sodium-hydroxide solution through the conduit 3, the temperature being adjusted to 90°–110° C. The dissolver 5 is provided with a stirring means (not shown).

The sodium silicate solution from the dissolver 1 is passed through a conduit 7 to a mixer 8 provided with stirring means (not shown), while washing water and scrubbing water deriving from an aluminium fluoride plant is passed to the mixer through a conduit 9. In addition hereto, filtrate deriving from a subsequent stage can be charged to the mixer 8 through a conduit 4a. The temperature of the liquid charged through conduit 7 is about 60° C., and hence no additional energy need to be supplied to the precipitating cycle. Subsequent to charging the aforesaid to the mixer 8, sodium aluminate solution from the dissolver 5 is charged to said mixer 8 through a conduit 10, all silicate present immediately being precipitated as sodium silicoaluminate. The reaction temperature should lie in a temperature range of 50°–100° C.

The fine-grain solid phase obtained is passed through a conduit 11 to a separation stage 12 employing pressure or vacuum filtration. The separated filtrate is passed through a conduit 20 to a fluorine-recovery, or to a recipient, as shown by the dashed arrow 21. The residual filter cake is dried by suction on the filter and then, as shown by arrow 13, passed to a subsequent washing stage 14, to which warm water (50° C.) may also be passed, as shown by arrow 15, and optionally entrained sodium fluoroaluminate is decomposed thereby while slurried with sodium hydroxide solution charged through a conduit 16. When the sodium hydroxide charge is increased and the temperature raised at the same time, there is obtained instead of an amorphous product a crystalline sodium silicate aluminate of the type Zeolite A. After a reaction time of about 1 hour at a temperature of approximately 50° C., the amorphous silicate product is passed to a separation stage 18 through a conduit 17, when the product is subjected to pressure or vacuum filtration and dried at 105° C., and is removed as a product, as shown by arrow 19. Alternatively, the product can be removed in the form of a suspension containing about 30% dry substance. A suspension of this nature can be used to advantage in partially replacing the titanium dioxide used in the papermaking industry as a filler material. The filtrate resulting from the aforesaid slurrying and filtering operations is returned through conduits 4, 4b to the next sodium silicoaluminate precipitation process in the mixer 8, while a minor part is returned through conduits 4, 4a to be used in preparing sodium silicate solution in the dissolver 1. If the sodium silicoaluminate product is to be used as a filler in paper manufacture, the grain size of said product can be influenced as desired by charging aluminium sulphate to the mixer 8, sodium sulphate becoming present in the precipitate. The grain size can also be influenced, however, by regulating the amount of hydroxide added to the washing stage 14 through a conduit 16.

The filtrate from stage 20 is passed to a mixer 22 through a conduit 20. An aluminium sulphate solution is also charged to the mixer 22, through a conduit 23, said aluminium sulphate solution being charged in such an amount that all sodium fluoride present is precipitated as sodium fluoroaluminate, also known as cryolite. This precipitation preferably takes place at a pH-range of 8–10 and at a temperature of about 50° C. The aluminium sulphate solution should contain approximately 8% $Al_2O_3$, at which concentration the solution can be stored without risk of solid aluminium sulphate crystallizing. If the pH-value of the mixture in the mixer 22 is excessive subsequent to charging the aluminium sulphate, the pH can be lowered by adding a minor quantity of sulphuric acid. Upon completion of the precipitation process, all of the contents of the mixer 22 are passed through a conduit 24 to a separation stage 25, in which a sodium fluoroaluminate product is separated off by pressure- or vacuum filtration. The product is dried at a temperature of approximately 100° C., and is removed for retailing, as shown by the arrow 26. The filtrate, whose only impurity consists of minor quantities of sodium sulphate, is removed through a conduit 27 and passed to a recipient, or for use as process water in another process.

EXAMPLE 1

130 grams of silica waste were dissolved in 135 ml of a 50%-sodium hydroxide solution. The silica waste contained, inter alia, 24.0% $H_2O$, 66.0% $SiO_2$, 3.27% F and 1.06% Al. The silica waste dissolved at about 80° C. At the same time there was prepared a sodium aluminate solution by dissolving 362 g of aluminium hydroxide containing 10.3% of $H_2O$ in 400 g of 50%-sodium hydroxide at a temperature of about 100° C. The mole ratio of $Na_2O/Al_2O_3$ was, in this case, 1.20. The sodium silicate solution obtained was added to 2000 ml of liquid containing mother liquor, washing water and scrubbing water containing 22.9 F/l, 4.1 g Al/l and 5.4 g $SiO_2$/l. Subsequent to this addition, the sodium aluminate solution was added, whereby the silicate content of the solution precipitated as sodium silicoaluminate. The precipitate was filtered off and dried by suction, and then slurried in 1000 ml of warm water, and any sodium fluoroaluminate which had precipitated together with the sodium silicoaluminate was decomposed during the slurrying process by adding 25 ml of a 50% sodium hydroxide solution. After 1 hour at 50° C., an amorphous silicate product was separated off by pressure filtration, and dried at 105° C. The sodium silicoaluminate product obtained had a weight of 250 g in a dry state, and contained, inter alia, 40% $SiO_2$, 12% Na, 14% Al and <0.2% F and 15% $H_2O$ and its brightness was measured as being 96%. 165 ml of aluminium sulphate solution containing about 8% $Al_2O_3$ were added to the filtrate, and the pH was adjusted to 8-10 by adding a minor quantity of sulphuric acid. The sodium-fluoroaluminate precipitated obtained was separated off by pressure filtration and dried at about 100° C. 80 g of sodium fluoroaluminate (cryolite) containing, inter alia, 49% F, 32% Na, 13% Al, and 0.4% $SiO_2$, were taken out.

EXAMPLE 2

In a test run in accordance with Example 1 above the cryolite obtained contained 54% F, 29.3% Na, 13% Al, and 0.4% $SiO_2$.

EXAMPLE 3

The procecdure of Example 1 above was repeated except for an addition of $CaCl_2$ in the first stage, i.e. in the preparation of sodium silicoaluminate. Thereby calcium was added in an amount corresponding to twice the molar amount of phosphate present in the waste products. Thereby calcium phosphate was precipitated whereby the phosphate residue in the final cryolite product was decreased to less than 0.04%, approximately 0.02%.

Generally, the phosphate contents of the mother liquors are 50-100 mg of $P_2O_5$ per liter.

Above calcium chloride has been used, but calcium hydroxide and calcium nitrate can be used as well.

I claim:

1. A method for recovering useable products from waste products produced in the manufacture of aluminum fluoride from aluminum hydroxide and fluorosilicic acid, which comprises the steps of
    (a) preparing a first solution by dissolving silica precipitate produced in the manufacture of aluminum fluoride in a strongly basic hydroxide;
    (b) preparing a second solution by dissolving aluminum hydroxide with a strongly basic hydroxide;
    (c) combining solutions (a) and (b) with waste mother liquor from the manufacture of aluminum fluoride, the proportions of solution (a), solution (b) and waste mother liquor being such that the pH value of the mixture lies between about 10 and 14, whereupon the silica content of the waste products is precipitated as a silicoaluminate;
    and
    (d) separating the precipitated silicoaluminate and recovering a clarified residue solution.

2. The method according to claim 1, which further comprises the steps of
    (a) adding an aluminum compound in an amount sufficient to precipitate the fluorine content, contained in the clarified residue solution, as a fluoroaluminate
    and
    (b) separating the precipitated fluoroaluminate and recovering a clarified residue solution.

3. The method according to claim 2, wherein the strongly basic hydroxide is sodium hydroxide and the fluorine is recovered as sodium fluoroaluminate (cryolite).

4. The method according to claim 2, wherein the separation of the precipitated fluoroaluminate is performed by filtration.

5. The method according to claim 1, wherein step (c) further comprises combining washing water with solutions (a) and (b) and waste mother liquor.

6. The method according to claim 1, wherein the strongly basic hydroxide is a hydroxide of alkali metal.

7. The method according to claim 1, wherein the strongly basic hydroxide is sodium hydroxide and the silica is recovered as sodium silicoaluminate.

8. The method according to claim 1, which further comprises the steps of
    (a) slurrying the silicoaluminate precipitate formed in step (c) in warm water with a strongly basic hydroxide to reprecipitate the silicoaluminate;
    (b) separating the reprecipitated silicoaluminate and recovering a clarified washing water; and
    (c) returning the washing water to the precipitation stage of step (c).

9. The method according to claim 1, wherein the separation of the precipitated silicoaluminate is performed by filtration.

* * * * *

UNITED STATES PATENT AND TRADEMARK OFFICE
CERTIFICATE OF CORRECTION

PATENT NO. : 4,436,629
DATED : March 13, 1984
INVENTOR(S) : Lennart Berglund

It is certified that error appears in the above-identified patent and that said Letters Patent is hereby corrected as shown below:

Column 5, line 26, after "22.9" insert -- g --.
Column 5, line 57, "procecdure" should read -- procedure --.

Signed and Sealed this

Twenty-seventh Day of November 1984

[SEAL]

Attest:

GERALD J. MOSSINGHOFF

Attesting Officer — Commissioner of Patents and Trademarks